US012311209B1

(12) United States Patent
Yu

(10) Patent No.: US 12,311,209 B1
(45) Date of Patent: May 27, 2025

(54) NON DESTRUCTIVE FIRE SPRINKLER SYSTEM

(71) Applicant: Simon Siu-Chi Yu, Oakland, CA (US)

(72) Inventor: Simon Siu-Chi Yu, Oakland, CA (US)

( * ) Notice: Subject to any disclaimer, the term of this patent is extended or adjusted under 35 U.S.C. 154(b) by 0 days.

(21) Appl. No.: 18/648,248

(22) Filed: Apr. 26, 2024

(51) Int. Cl.

| | |
|---|---|
| ***A62C 35/68*** | (2006.01) |
| ***A62C 3/16*** | (2006.01) |
| ***A62C 31/02*** | (2006.01) |
| ***A62C 35/02*** | (2006.01) |
| ***A62C 35/15*** | (2006.01) |
| ***A62C 37/11*** | (2006.01) |
| ***A62C 37/50*** | (2006.01) |

(52) U.S. Cl.
CPC ................ *A62C 35/68* (2013.01); *A62C 3/16* (2013.01); *A62C 31/02* (2013.01); *A62C 35/15* (2013.01); *A62C 37/11* (2013.01); *A62C 35/026* (2013.01); *A62C 37/50* (2013.01)

(58) Field of Classification Search
CPC ........... A62C 3/006; A62C 3/16; A62C 31/02; A62C 31/28; A62C 35/02; A62C 35/026; A62C 35/11; A62C 35/13; A62C 35/15; A62C 35/68; A62C 37/04; A62C 37/11; A62C 37/36; A62C 37/38; A62C 37/40; A62C 37/50
See application file for complete search history.

(56) References Cited

U.S. PATENT DOCUMENTS 3,588,893 A * 6/1971 McCloskey .......... A62C 99/009 340/630
3,866,687 A * 2/1975 Banner ................ A62C 35/605 169/65
5,315,292 A * 5/1994 Prior ...................... A62C 37/38 169/61
5,548,276 A * 8/1996 Thomas ................. A62C 37/38 250/342
5,617,923 A * 4/1997 Nishikubo ............. A62C 35/02 169/11
5,632,341 A * 5/1997 Allen ..................... A62C 35/02 169/37

(Continued)

FOREIGN PATENT DOCUMENTS

CN 112807596 A * 5/2021 ........... A62C 31/005
CN 114681850 B * 4/2023 ............. A62C 31/03

(Continued)

*Primary Examiner* — Darren W Gorman
(74) *Attorney, Agent, or Firm* — Lyman Moulton, Esq.; Moulton Patents, PLLC

(57) ABSTRACT

An artificial intelligence guided, flame tracking fire suppression liquid spray nozzle on a pan tilt turret base is recessed into a ceiling with a decorative hinged panel. A built-in smoke detector flush with the ceiling, senses for smoke and in an event fire breaks out, the ceiling panel flips down and drops the pan tilt turret base to search and lock on and track the flame. The spray nozzle splashes the flame with fire suppressant from its limited volume ceiling suppressant tank via a high pressure spray pump. The ceiling tank is backed up via a hose connected to a high volume refill tank located remotely. The system operates on a rechargeable battery and shuts down when the fire is extinguished. Additionally, a hand gesture signal on site or a remote command via Wi-Fi in an emergency provides a fail-safe shutdown to assure premises will not suffer destruction.

7 Claims, 9 Drawing Sheets

(56) References Cited

U.S. PATENT DOCUMENTS

| | | | | | |
|---|---|---|---|---|---|
| 5,727,634 | A * | 3/1998 | Ishida | A62C 31/05 | |
| | | | | 169/61 | |
| 6,975,225 | B2 * | 12/2005 | Privalov | A62C 37/40 | |
| | | | | 340/539.25 | |
| 7,066,273 | B2 * | 6/2006 | Tan | A62C 37/40 | |
| | | | | 169/41 | |
| 9,155,927 | B2 * | 10/2015 | Newton | A62C 37/40 | |
| 10,850,146 | B2 * | 12/2020 | Lee | B05B 3/1035 | |
| 2016/0121148 | A1 * | 5/2016 | Al-Hebshi | A62C 35/10 | |
| | | | | 169/61 | |
| 2017/0259097 | A1 * | 9/2017 | Orglmeister | A62C 31/28 | |
| 2017/0319882 | A1 * | 11/2017 | Hart | A62C 31/03 | |
| 2019/0099631 | A1 * | 4/2019 | Hart | A62C 31/28 | |
| 2021/0069538 | A1 * | 3/2021 | Magnone | A62C 31/24 | |
| 2021/0134131 | A1 * | 5/2021 | Shin | A62C 99/009 | |
| 2021/0228926 | A1 * | 7/2021 | Hofmann | A62C 37/04 | |
| 2022/0161083 | A1 * | 5/2022 | Bolz-Mendel | A62C 37/40 | |
| 2022/0280824 | A1 * | 9/2022 | Muhammad | A62C 37/44 | |
| 2022/0305315 | A1 * | 9/2022 | Dusing | A62C 37/04 | |
| 2024/0115893 | A1 * | 4/2024 | Ruhe | A62C 37/10 | |

FOREIGN PATENT DOCUMENTS

| | | | | |
|---|---|---|---|---|
| DE | 102021004290 | A1 * | 2/2023 | A62C 37/10 |
| GB | 2561831 | A * | 10/2018 | A62C 37/08 |
| KR | 20170124387 | A * | 11/2017 | A62C 37/08 |
| KR | 20220159883 | A * | 12/2022 | A62C 37/38 |
| KR | 102553690 | B1 * | 7/2023 | G06Q 50/26 |
| KR | 20230139416 | A * | 10/2023 | A62C 37/38 |
| WO | WO-2014025233 | A1 * | 2/2014 | A62C 13/64 |
| WO | WO-2021150600 | A1 * | 7/2021 | A62C 31/05 |

* cited by examiner

NON DESTRUCTIVE FIRE SPRINKLER SYSTEM

CROSS REFERENCE

Applicant claims priority to the Provisional patent application 63/630,058 filed Dec. 26, 2023 titled Non Property Destructive Fire Sprinkler System for New Home Construction and Existing Home Retrofit by Simon Siu-Chi Yu which is incorporated entirely into the present non-provisional patent application.

BACKGROUND

The disclosed invention is directed to a multi-purpose and multi-configuration apparatus used for indoor fire fighting for new and existing residential homes and commercial structures. The disclosure is a cost effective alternative for fire safety and prevention over traditional passive fire sprinklers that cause secondary damage due to water and flooding of the affected areas.

When it comes to fire safety and prevention in a home, there is no room for error with other alternatives. It is costly to install a traditional passive system which requires fire department and local city building permits and inspector approval. Each year, house fires cause thousands of civilian deaths, hundreds of thousands are treated for burns resulting in billions of dollars in direct property damage and medical costs. In recent years, many state and local city officials have mandated new residential construction and existing homes install or retrofit automatic fire prevention systems. Installing fire sprinklers in new homes costs tens of thousands of dollars and often cost more in existing homes requiring retrofitting for a better chance of survival when a house catches fire.

Additionally, fire sprinklers installed in a residential home require a much larger water supply feed line increasing the cost. In general, a single family home requires a 1.5 inch water meter to meet the sprinkler flow and water pressure demands cost more than the fire sprinkler installation itself. The legacy water based fire sprinkler system has been the gold standard for centuries because of its proven record. However this traditional fire prevention technology creates massive destruction to property through flooding and pollution and subsequent toxic mold cleanup. Because insurance companies pick up the damage, water damage claims drive up monthly premiums. The present disclosure provides current artificial intelligence technology and is more affordable than what is heretofore available on the market to consumers.

SUMMARY OF THE INVENTION

The present disclosure benefits from years of residential construction over decades including the design and installation of numerous fire sprinkler systems for new homes. Since fire sprinklers provide a comfort and sense of safety for occupants, it is good practice to have a fire sprinkler installed even at a hefty cost. There are numerous considerations in planning a sprinkler system including nearest fire hydrant flow rate and pressure. In some areas which have low pressure will often require an onsite large capacity storage tank with compressed air tank to deliver water for the sprinklers. Periodic testing of each sprinkler for proper function is not possible without heating the heat sensitive glass bulb to 155 degree in Fahrenheit and flooding the premises at 14 gallon per minute rate until someone shuts off the water meter.

When a room catches fire, the traditional passive overhead sprinkler relies on the room temperature to rupture the sprinkler's glass bulb, whereupon it blindly sprinkles water into a room already engulfed in flame. Oftentimes, it is too late to prevent fire damage.

The present disclosure drastically reduces the cost of sprinkler installation and damage compared to the traditional water based fire sprinklers. It does so without the concerns of low water flow and pressure and contaminating sprinkler back flows into domestic water supplies. Installation of the disclosure is as simple as installing a recessed light on a ceiling or mounting a small light fixture on a wall.

The present disclosure also addresses the personal privacy concern that occupants don't want to be watched on camera in their bedroom. Therefore, when the sprinkler system is not in a deployed position, the disclosure conceals its cameras from open view filming.

The present disclosure makes use of enhanced repurpose face tracking, object tracking computer vision and machine vision software and hardware. The disclosure therefore tracks movement in flame temperature, flame size and flame shape in real time to decide to extinguish a fire before it spreads by directing aqueous fire suppressant precisely on the flame.

The present disclosure works through a novel system of software and wireless controls for a rechargeable battery, fire suppressant, smoke and heat detector, optical video and thermal image tracking cameras. MCU (Micro Controller Unit) pan tilt mechanical structure and fire suppressant splashing turret.

Some embodiments have a single turret sprinkler system where initially all components are placed in sleep mode to silence the pan tilt servo motors and cameras, except the smoke detector is actively monitoring for heat and smoke in a room. When smoke or heat is detected, it alerts the homeowner or fire dept. via Wi-Fi and immediately wakes up all system components causing the pan tilt mechanical structure that carries the optical video, thermal camera and nozzle together searching and tracking for the source of flame. After the flame is located. the thermal camera determines the size, shape and temperature to determine if a real fire has occurred. Once identified, the nozzle splashes the flame with fire suppressant such as Polyphosphate, Ammonium Polyphosphates, Mono ammonium phosphate, Sodium Polyphosphate and the like. The nozzle continuously tracks the flame movement, therefore the suppressant lands only on the target affected by the flame. After the smoke detector and thermal camera are no longer alerting smoke or flame exists, the system shuts the nozzle off by removing electric power to its high pressure suppressant pump and its control system then goes into sleep mode again while keeping the smoke detector power on and active all time. The high pressure suppressant pump can also be shut down in an emergency by showing a five human's fingers palm gesture as a "STOP" signal recognized by the optical video camera. Subsequently. showing a zero plus three fingers "OK" gesture will signal the spray action to resume. This system of fire prevention preemptively stops a fire as soon as it starts and through human intervention results in dramatically minimizing the damage and increases the chance of survival of human life.

Exemplary components of the object and flame tracking system are open source OV 5640 optical video camera, and Flir Lepton 2 Thermal Sensor Camera on Open MV Pure Thermal board. The optical video and thermal image tracking camera is a combined face-object movement tracking system using a Raspberry Pi Computer board and OpenCV and Pan-Tilt HAT and Python.

Figure 1:
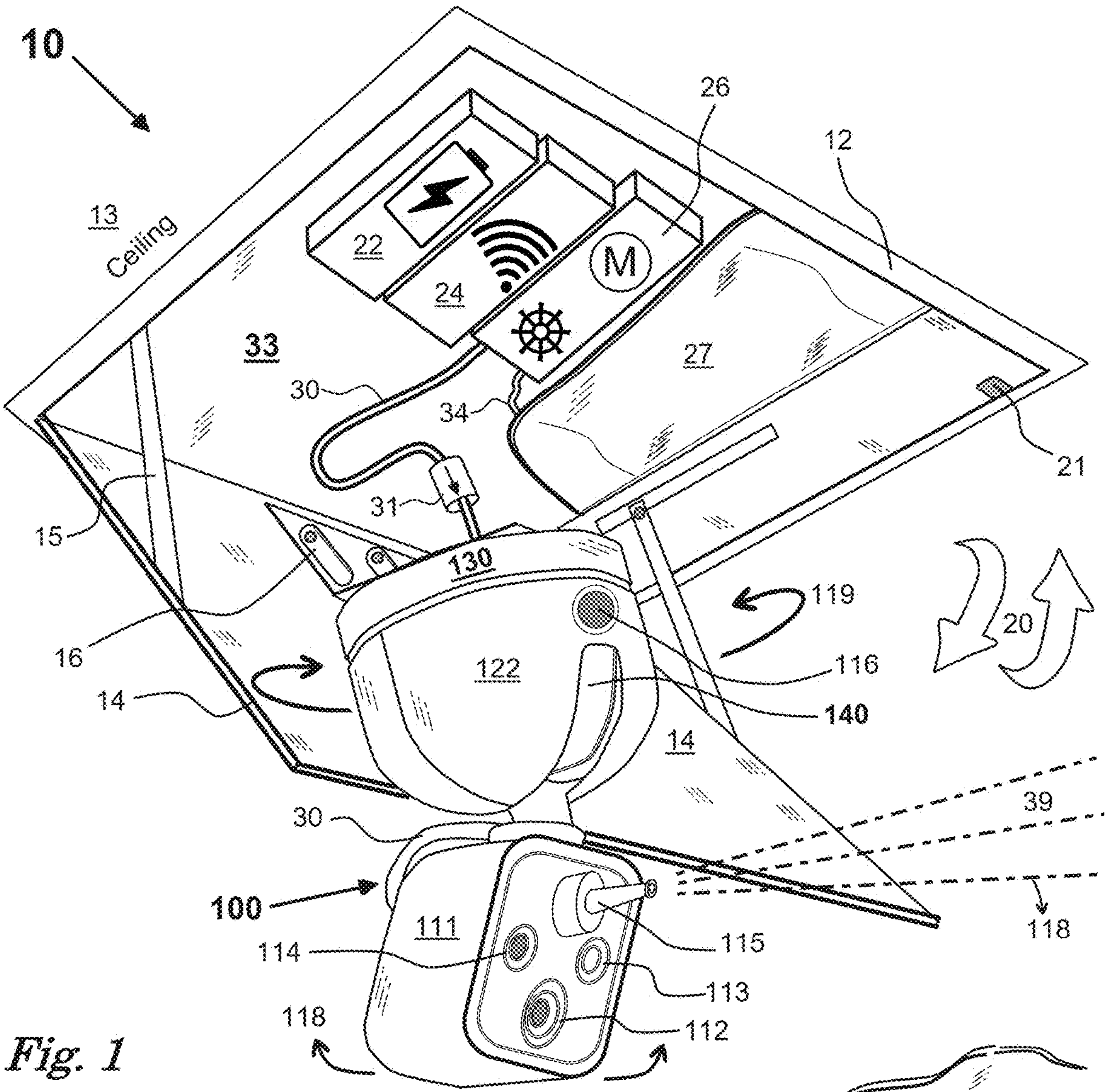
FIG. 1 is the perspective view of a turret configured fire sprinkler recessed into a ceiling cavity for new construction in residential and commercial structures in accordance with an embodiment of the present disclosure.

Throughout the description, similar and same reference numbers may be used to identify similar and same elements in the several embodiments and drawings. Example: The term flame and fire are interchangeable. Top off and fill up are interchangeable. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

For understanding the disclosure, referring to FIG. 1 is the flip down concealed behind ceiling turret fire sprinkler system 10 is configured for new and existing home 510. The automated flame tracking turret fire sprinkler module 100 is mounted on the interior side (back side) of flip panel 14 with a hinge connected to flip down chassis frame 12 flushes on ceiling board 13. The frame 12 further includes slide rail 16 mounted on ceiling mounted flip down hinged door panel 14 supported by panel stop rod or chain 15 to limit the swing of panel 14. The auto flame tracking turret fire sprinkler module 100 attached to a slide rail 16. A recessed mounted flame resistance can 37 fitted with ceiling rechargeable battery 22, Wi-Fi 24, high pressure fire suppressant spray pump 26 such as a (SHURFLO brand) forces the fire suppressant 39 drawing from ceiling fire suppressant tank 27 via hose 34 and 30 and anti-drip valve 31 then expelled through fire suppressant spray nozzle 115. A stirring pump 25 and a continuous top-off fluid shutoff valve 23 receiving fill fire suppressant 39 from a large capacity remotely located supplemental fire suppressant storage tank 573 through ceiling tank fill inlet 32.

Upon smoke and heat detection sensor detector 132 detected smoke or heat will alert and wake up the turret module 100. Since the module 100 is stowed inside ceiling cavity 33. The woke up module 100 sends a panel latch release signal to flip down hinged door panel release latch 21 letting the panel 14 flip down shown in arrow 20, then module 100 slide down shown in arrow 36. The turret head assembly 111 cleared from the panel 14 in full view of the room and starts searching for a fire 50 with its optical video camera 114 looking for objects and human gesture signal while the thermal image tracking camera 112 searching for a real fire 50 in pan motion 119 and tilt motion 118 through the pan servo motor 130 and turret tilt servo motor 140. When the thermal camera 112 detected a flame 50 is above 155 degrees in Fahrenheit, the system control and turret pan tilt MCU 122 activates the pump 26, sending optical photos to the owner or fire department via Wi-Fi 24. The MCU controller 122 keeps tracking the movement of flame 50 guiding the nozzle 115 precisely landing fire suppressant 39 directly on the flame 50. The nozzle 115 blasting the suppressant 39 can reach 25 feet (8 meter) away at 1.5 gallon (6 liter) per minute and its flow rate and pressure can be adjusted with a PWM (Pulse Width Modulation) pump driver circuit determined by the laser distance sensor 113. The LED light 116 illuminates the room for optimal optical photo or video and to define object and tracking.

Figure 1B:
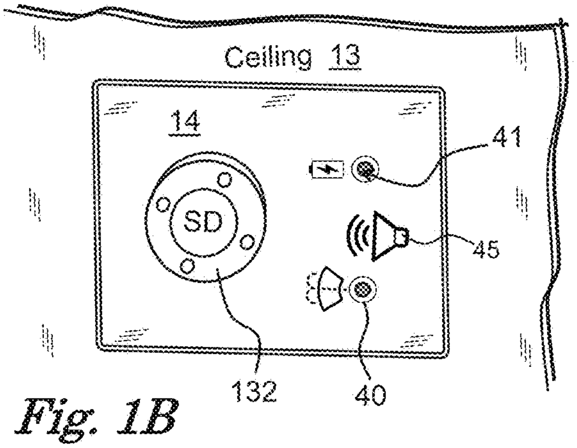
FIG. 1B is the perspective view of a turret configured fire sprinkler panel pushed back in a hide-away closed non deployed position in accordance with an embodiment of the present disclosure.
Figure 1A:
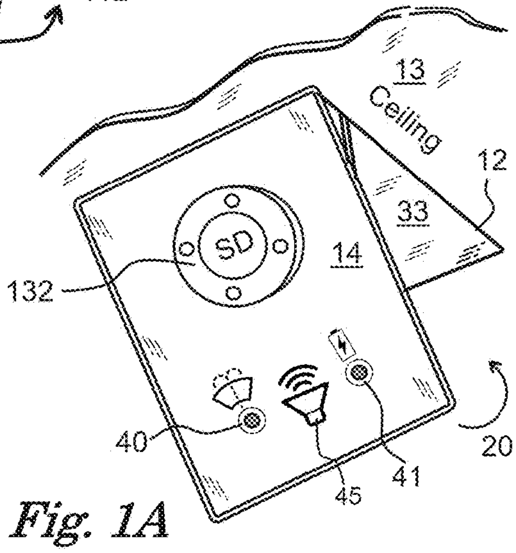
FIG. 1A is the perspective view of a turret configured fire sprinkler panel popped open in accordance with an embodiment of the present disclosure.

FIG. 1A is the exterior side (front surface) of flip panel 14 shows a smoke detector installed on panel 14 and alert warning indicator LED 40 when ceiling tank 27 suppressant is low and indicator LED 41 when battery is low and audio sounder warning signal 45 for the system needs maintenance.

FIG. 1B the module 100 is in a stowed position after the smoke detector no longer detects smoke. The panel 14 flushes with the ceiling board 13.

Figure 2:
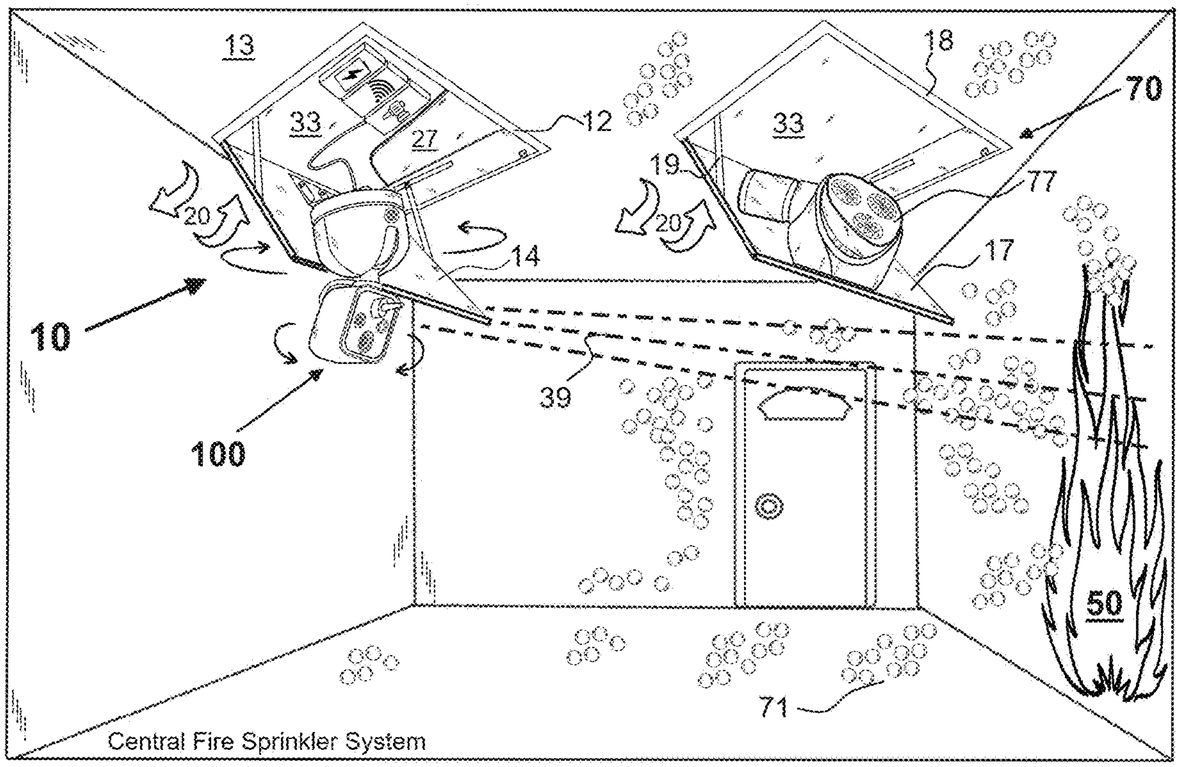
FIG. 2 is an illustration of a new construction home installed with a turret fire sprinkler and combined with a bubble generator module to speedily extinguish a fire in accordance with an embodiment of the present disclosure.

Turning to FIG. 2 is a (CFSS) central fire sprinkler system utilizing flip down concealed ceiling turret fire system 10 installed on ceiling board 13 is in deployed and in operation position. The turret head 111 can rotate 360 degrees and it tilts 180 degrees with the head 111 carries the suppression nozzle 115 covers the room area within 25 feet radius.

Also notice the bubble generator module 70 installed on the frame 18 with a hinged flip down panel 17. The panel 17 flip down indicates by arrow 20, panel 17 opening is set by the stop rod or chain 19. When both of the module 100 spray suppressant 39 and the bubble generator 77 blowing fire suppressant added bubbles 71 are in operation to help speed up extinguish the fire 50.

Figure 3:
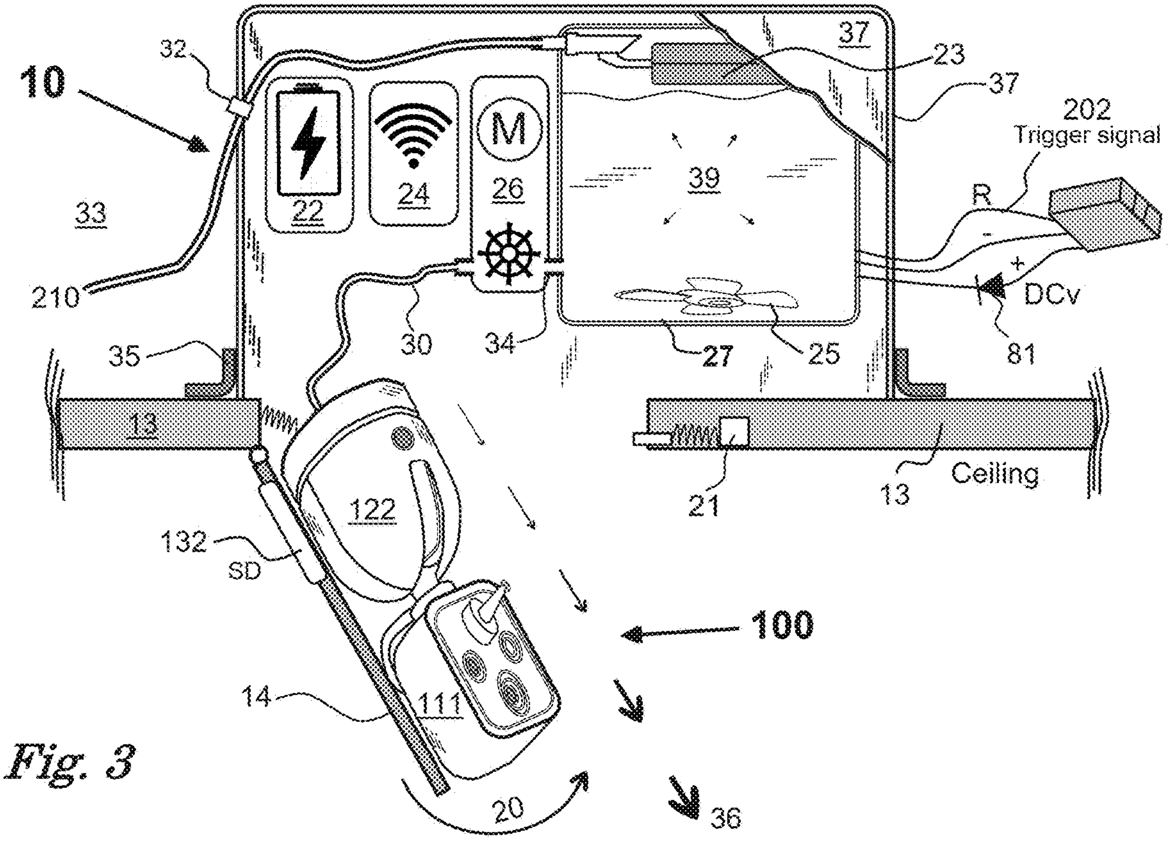
FIG. 3 is a cross sectional view showing a new construction turret fire sprinkler system with its recess metal can installed in the cavity of a ceiling, its panel flipped open letting the turret fire sprinkler module slide down in accordance with an embodiment of the present disclosure.

FIG. 3 is a cross section of system 10 showing a recessed housing 37 installed with a mounting bracket 35 behind the ceiling board 13. The recessed housing 37 contains a rechargeable 12v 10 amp high capacity battery pack 22 has enough power to maintain the system 10 up to one hour continuous operation. A Wi-Fi 24 connected to the home Wireless router, a ceiling suppressant holding tank 27 holds about one to two gallon (8 liters) of fire suppressant 39 with automatic top-off via a fluid shutoff valve 23. The tank 27 is filled all time by fire suppressant supply hose 210 supplies from a remote tank 573. A stir pump 25 is to maintain the suppressant 39 correct mixture consistency and prevent the suppressant 39 settled on bottom of tank 27. A high pressure high flow spray pump 26 pulls suppressant 39 from hose 34 and exits via hose 30 then blasting out aiming at fire 50 via nozzle 115. The module 100 shown is the panel 14 has dropped when the panel latch 21 energized letting the turret sprinkler 100 sliding down as arrow 36 shown when the smoke detector 132 sending a warning signal from itself or sent from another remote smoke detector trigger signal 202 from other rooms. A DCv (direct current volt) diode 81 on the plus "+" line with a negative "−" line accompany the trigger signal 202. After fire 50 was extinguished and smoke detector 132 was no longer in warning status, the spray pump 26 stopped. Homeowners can manually push the turret module 100 back into the ceiling cavity 33 and flip up the panel 14 shown in arrow 20 then the panel 14 is flush with ceiling board 13 by the latch 21 again.

Figure 4:
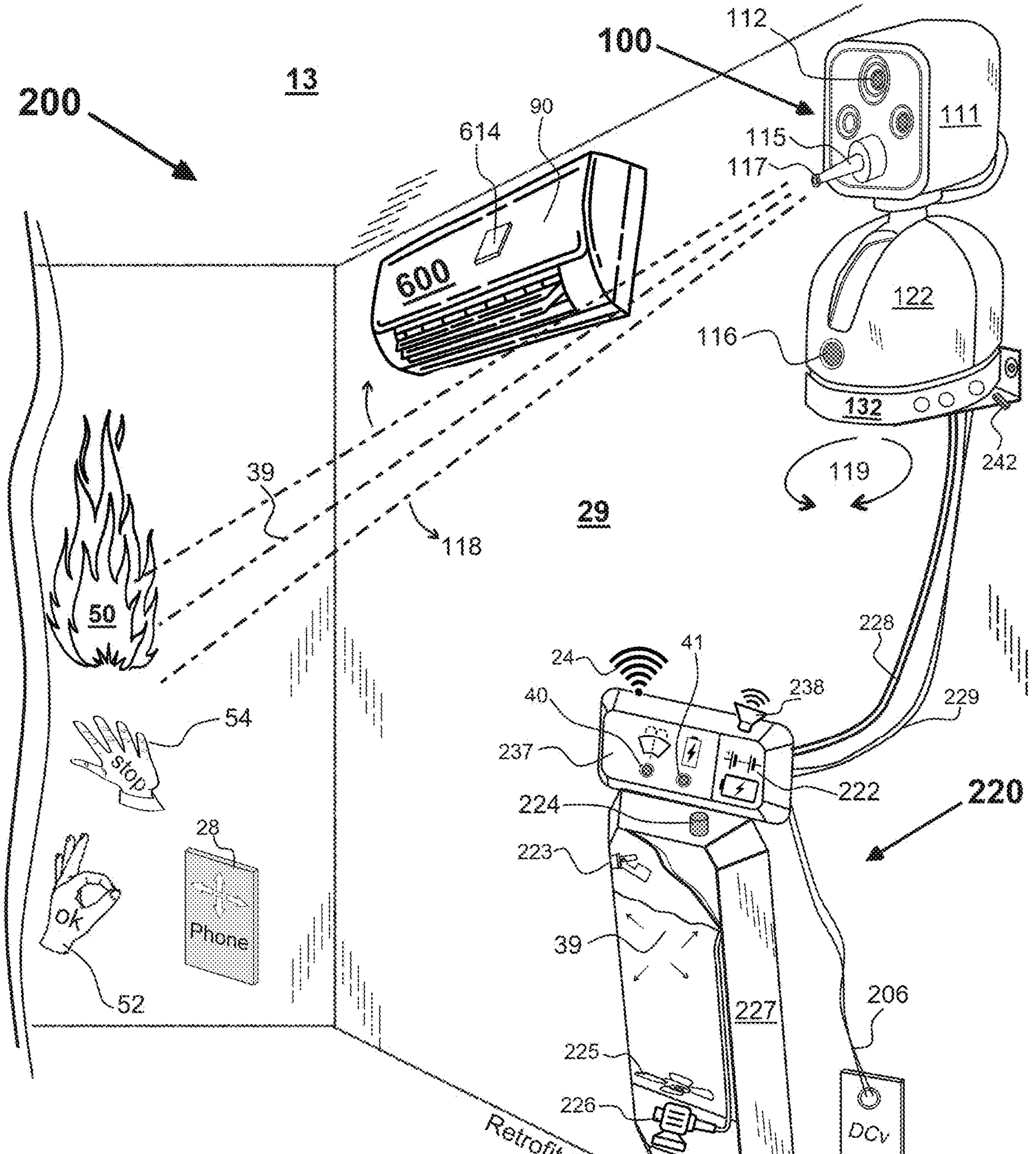
FIG. 4 is the perspective view of a turret configured fire sprinkler for retrofit of existing homes in two split sections including a lower wall section with a fire suppressant tank and power supply, and an upper room section includes an automated flame tracking turret fire sprinkler module in accordance with an embodiment of the present disclosure.

FIG. 4 wall mount (RSFSS) retrofit split fire sprinkler system 200 for an existing home retrofit to protect a room in the event fire broke out. The system 200 is a two section split configuration that lower wall 29 mounted section 220 includes a fire suppressant tank 227, a charge cable 206 provide electricity to rechargeable battery pack 222, a battery and control panel 237 houses a Wi-fi 24, a low fire suppressant level warning indicator 40, low battery level warning indicator 41 and an audio sounder 238 alerts the owner pays attention to maintain the system's health condition.

The suppressant tank 227 further includes a top-off fluid shutoff valve 223 to regulate suppressant 39 filling from a mobile fill station 550 through fill inlet 224. A stir pump 225 prevents suppressant 39 precipitated on the bottom of the tank 227 and causes clogging the high pressure spray pump 226.

Figure 4A:
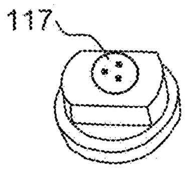
FIG. 4A is the perspective view of an orifice to be attached on a turret nozzle in accordance with an embodiment of the present disclosure.
Figure 4B:
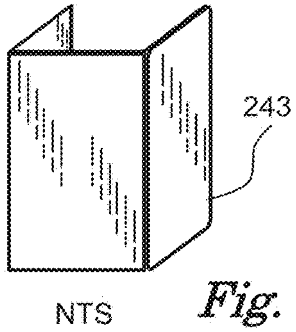
FIG. 4B is the turret cover dropped to ground when the automated flame tracking turret fire sprinkler module is deployed in action in accordance with an embodiment of the present disclosure.

The upper room mounted section is the module 100 anchored on a wall 29 with bracket and latch combo 242. A fire 50 triggered the smoke detector 132 and the thermal image tracking camera 112 and released the latch 242 result dropping the turret front cover 243 shown on FIG. 4B. The turret head 111 carries the nozzle 115 aiming at the fire 50 blasting with pressurized suppressant 39 delivered from the pump 226 via hose 228. Turret head 111 power is derived from small phone cable 229. Tracking the fire 50 movement is through the pan tilt MCU 122, shown on FIG. 12 that pan motor rotates 360 degrees shown in direction arrow 119, while tilt motor rotates 180 degrees shown in direction arrow 118. Suppressant 39 spray flow and dispersion pattern is defined by the orifice 117 shown on FIG. 4A. The system 200 is fully automated and self contained and is able to stop spraying a fire 50 when the fire 50 is extinguished. The turret sprinkler 100 also recognizes hand gesture commands through its optical video view camera 114 by enhancing with illuminating LED lighting 116 and can even be controlled with a smartphone 28. Under an emergency, showing a five fingers palm gesture 54 toward the camera 114 will stop the spray pump 226 and a zero plus three fingers gesture 52 will resume the spray pump 226 action.

Figure 8:
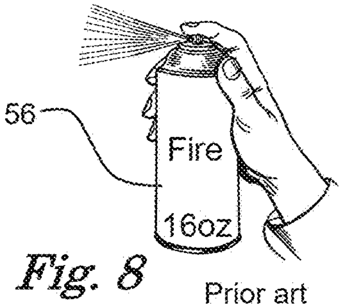
Fig. 8 Prior art
FIG. 8 is the perspective view of a popular aerosol fire extinguisher spray can application in accordance with an embodiment of the present disclosure.
Figure 8A:
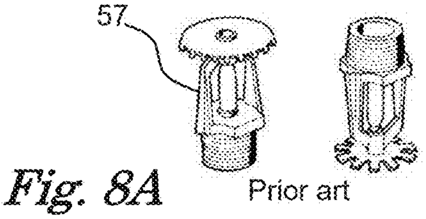
Fig. 8A Prior art
FIG. 8A is the perspective view of a traditional water based fire sprinkler head application in accordance with an embodiment of the present disclosure.

Based on a volume conversion and calculation: a size of 20 inch×30 inch×8 inch (51 cm×76 cm×20 cm) lower wall mount tank 227 holds 20 gallon or (75 liter) of fire suppressant 39. At the popular 16 once fire suppressant aerosol spray 56 depicted on FIG. 8 yields 0.125 gallon, which means a gallon equals 8 cans of aerosol spray 56. The tank 227 effectively holds an equivalent to 8×20=160 cans of aerosol fire suppressant spray 56. Manufacture data shows a 16 once spray can 56 lasts 30 seconds to empty. Given the flow rate at 1 gallon per minute, the spray pump 226 effectively sprays four equivalent cans of fire suppressant 56 simultaneously on the flame 50. Thus the tank 227 will be emptied in about 20 minutes. In real life situations, a fire 50 will be under control in a few minutes.

Figure 5:
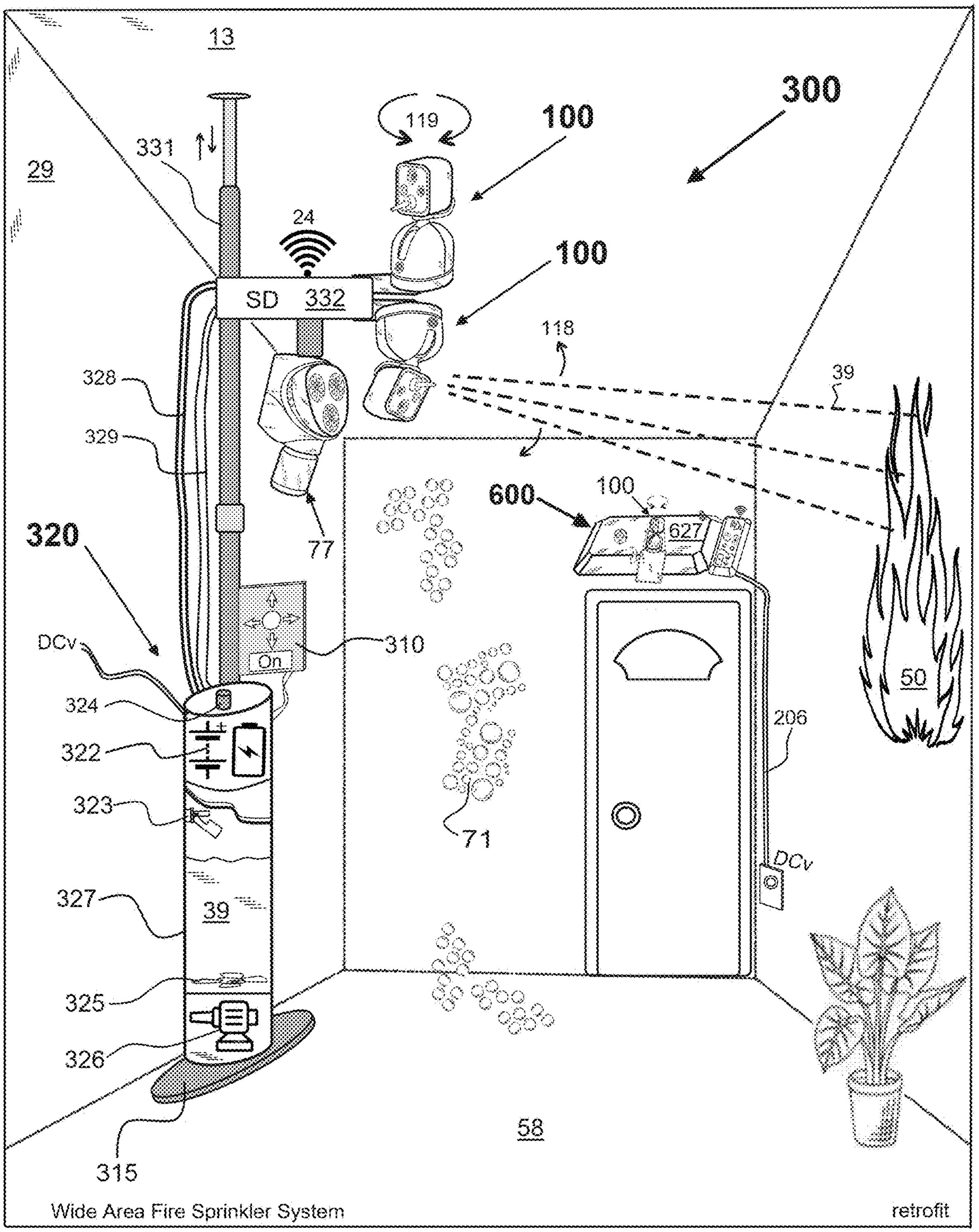
FIG. 5 is the perspective view of a turret configured fire sprinkler mounted on a floor post for retrofit existing homes in two split sections including a floor section with a fire suppressant tank and power supply, and an upper room section with two independent automated flame tracking turret fire sprinkler modules in accordance with an embodiment of the present disclosure.

Turning to FIG. 5 is a variant features (WAFSS) wide area fire sprinkler system application. A post mounted dual turret sprinkler system 300 similar to the FIG. 4. The system 300 is a free standing on floor 58 configuration supported by a mobile floor stand 315 and an extendable post 331 to reach the ceiling 13 for fixed position or without top support. The floor section 320 includes a fire suppressant tank 327, a charge cable 206 provide electricity to rechargeable battery pack 322, a battery and control panel 310 and a Wi-Fi 24, The suppressant tank 327 further includes a top-off fluid shutoff valve 323 to regulate suppressant 39 filling from a mobile fill station 550 through fill inlet 324. A stirring pump 325 prevents suppressant 39 precipitated on the bottom of the tank 327 and causes clogging the spray pump 326.

The upper room section is the two turret modules 100 anchored on the post 331 with brackets and a shared smoke detector 332. A fire 50 triggered the shared smoke detector 332 and the two thermal image tracking cameras 112 working independently. Each turret head 111 carries its nozzle 115 aiming at the fire 50 blasting with pressurized fire suppressant 39 delivered from the pump 326 via hose 328. The two auto flame tracking turret fire sprinkler modules 100 power are derived from small phone cable 329.

Each of the two auto flame tracking turret fire sprinkler module 100 modules is independently tracking a fire 50 or can be blasting the same fire 50 simultaneously. The dual sprinkler 300 system can be effectively fighting multiple fires 50 erupted in a room.

A bubble generator module 77 is attached to the upper room position on post 331 showering large numbers of bubble 71 that are mixed with fire suppressant 39 to displace the air volume and masking combustible materials with fire suppressant 39, making the room less combustible for speedy extinguishing of fire 50.

Figure 6:
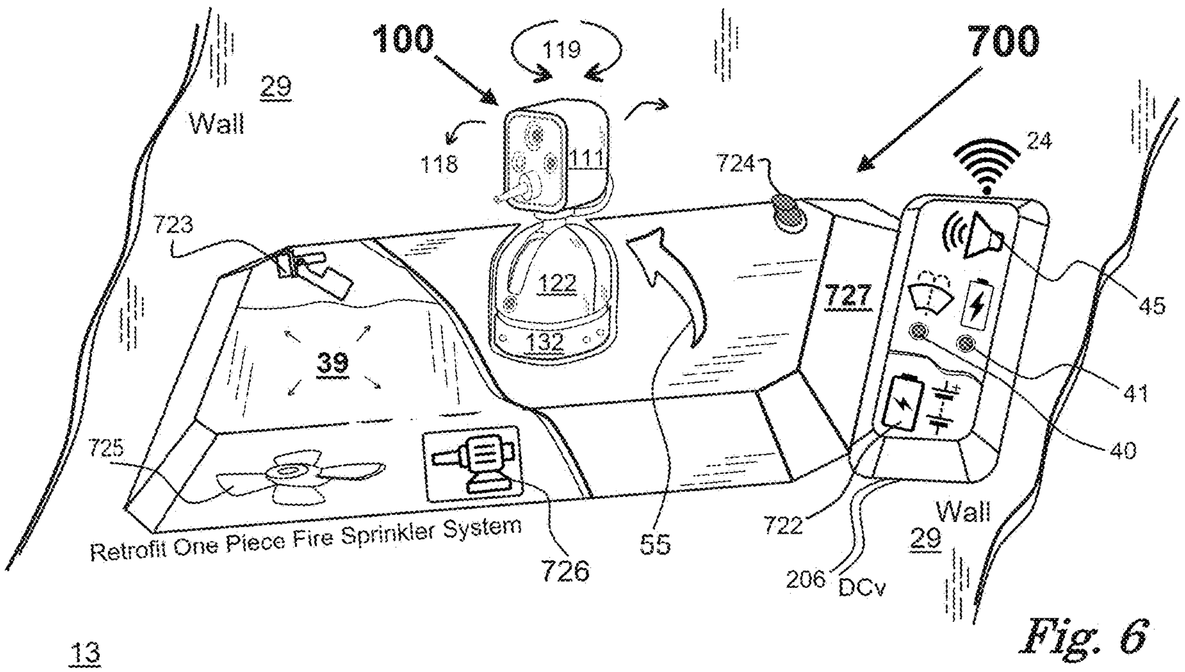
FIG. 6 is the perspective view of a semi-recessed single piece all-in-one including suppressant tank, battery power and automated flame tracking turret fire sprinkler module installed on upper room or over a door wall position in a retrofit application in accordance with an embodiment of the present disclosure.

FIG. 6 is an integrated, (ROFSS) retrofit one piece sprinkler system 700, which is a variant of FIG. 4. The system 700 resembles the system 200 includes control panel and battery 722, a fire suppressant tank 727, a suppressant pump 726, a stirring pump 725, a top-off fluid shutoff valve 723 and fill inlet 724. The auto flame tracking turret fire sprinkler module 100 normally rests on a cradle flush with the front surface of the tank 727. When a fire 50 is detected, the sprinkler module 100 popped up from its cradle shown on arrow 55 begins to fight the erupted fire 50. The single piece system 700 similar to system 600 is to be installed above a window, installed on the upper room of a wall 29 and on top of a door header as shown on FIG. 5. Power is supplied via a very small electric current phone line 206.

Figure 7:
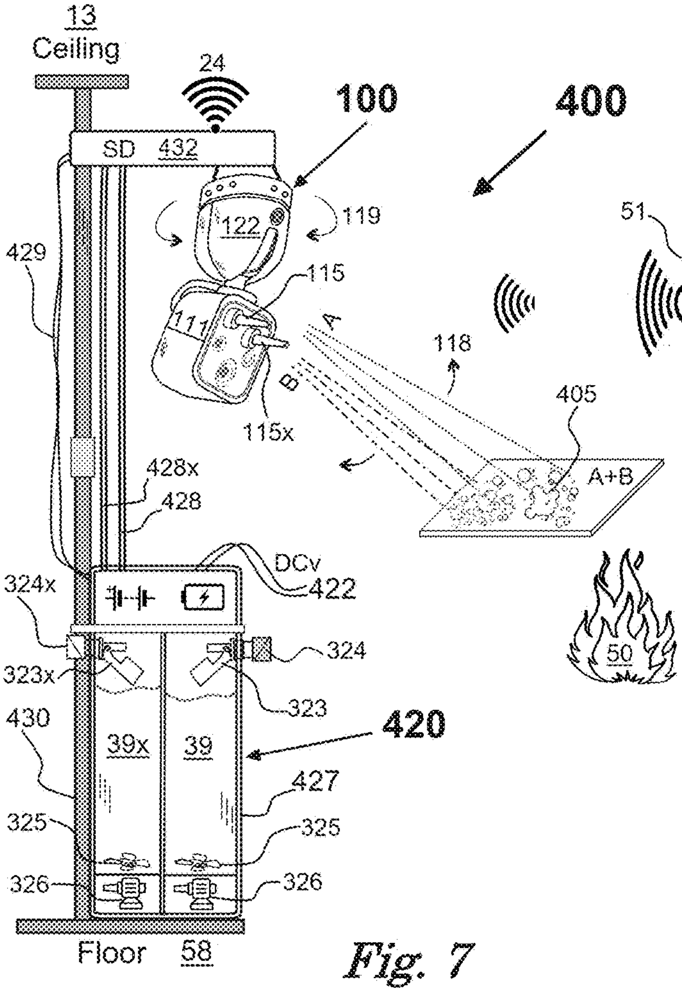
FIG. 7 is the perspective view of a turret configured fire sprinkler mounted on a floor post for retrofit existing homes in two split two sections including a floor section with dual fire suppressant tanks and power supply, and an upper room section automated flame tracking turret fire sprinkler module with two nozzles to generate spray dissimilar foams in accordance with an embodiment of the present disclosure.

Turning to FIG. 7 is (MDNFSS) Mobile Dual Nozzle fire sprinkler system 400. The system 400 can be mobile which is to be temporarily fixed on floor 58 and ceiling 13 via a tension post 430 holding the floor section 420 in place. The system 400 is a variant of FIG. 5 resembles the system 300 that section 420 includes control panel and battery 422 send power to the automated flame tracking turret fire sprinkler module 100 via cable 429, a dual fire suppressant tank 427, two suppressant pump 326, two stir pump 325, two top-off fluid shutoff valve 323, 323*x*, two fill inlet 428, 428*x* and fire suppressant supply hoses A and B. The turret sprinkler module 100 draws two dissimilar suppressants 39, 39*x* through hose 426 and 426*x* blasting out via nozzle 115 and 115*x* landed on target 405 then the two dissimilar fire suppressant 39 and 39*x* self mixed on the target 405 quickly reacting chemically similar to an intumescent reaction preventing combustible gas such oxygen entering the target 405 effectively extinguishing a fire 50. FIG. 7 showing a fire 50 erupted, first it triggers the smoke detector 432 then the thermal image tracking camera 112 picks up passive infrared electromagnetic waves 51 interprets as a real fire 50.

Figure 9A:
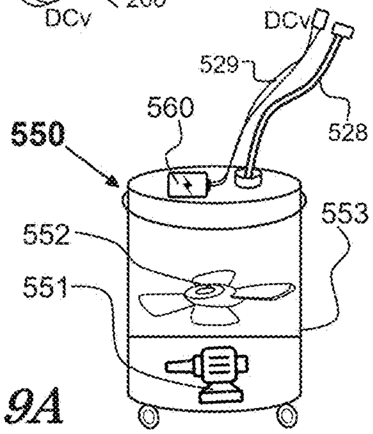
FIG. 9A is a depiction showing a mobile charge station capable of supplying top-off fire suppressant and electrical power to the interior of a house which is equipped with a turret sprinkler system in accordance with an embodiment of the present disclosure.
Figure 9:
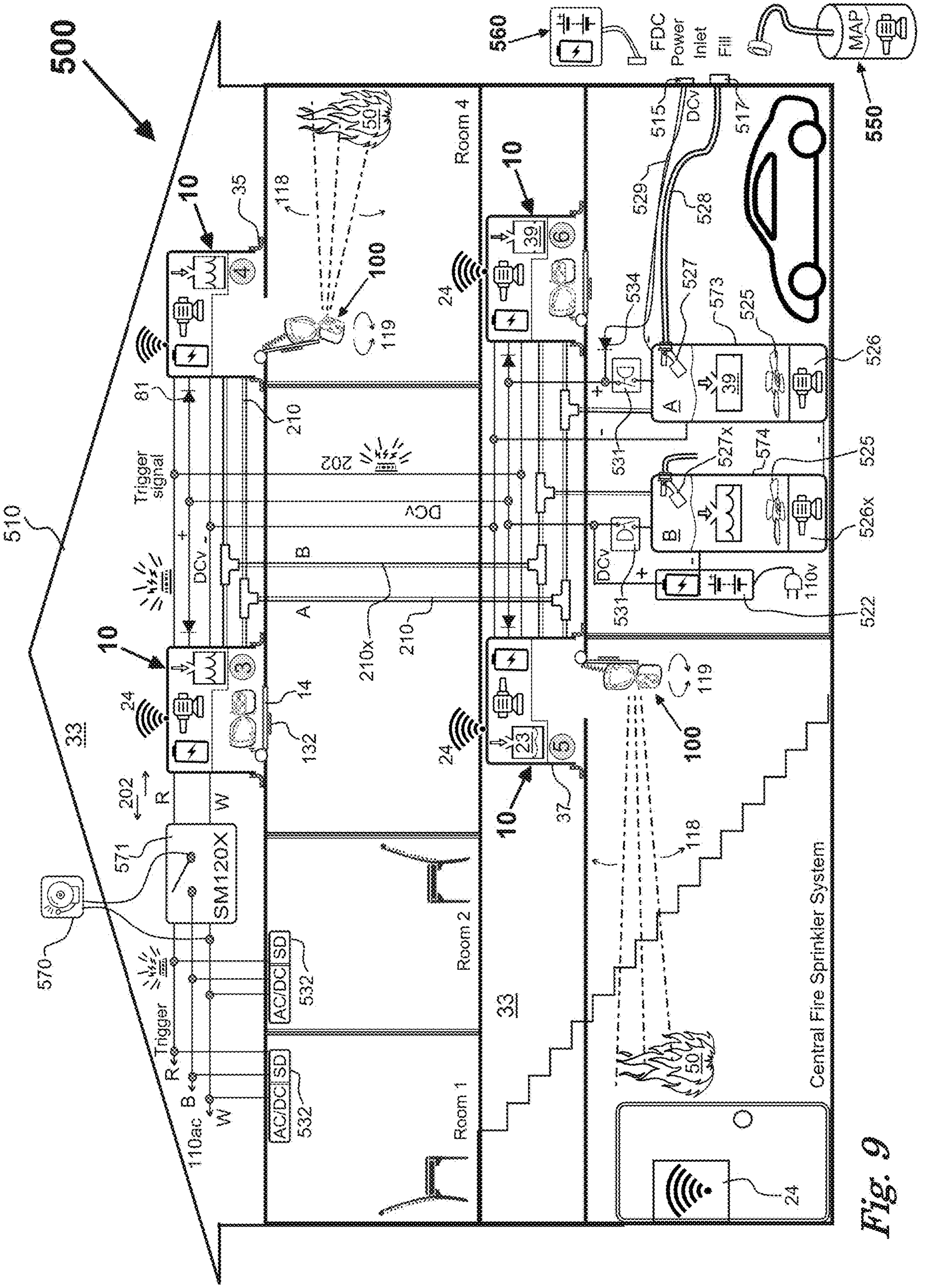
FIG. 9 is a schematic view illustrating the turret based fire suppression system installed on a new construction structure showing electrical wiring, plumbing layout and features accepting exterior suppressant top-off and exterior power booster components to extend operation duration in accordance with an embodiment of the present disclosure.

FIG. 9 is a concealed in ceiling 33 (CFSS) central fire sprinkler system 500 to be installed on a new home 510 with schematic drawings illustrating electrical wiring and plumbing connection. When a fire 50 is erupted, anyone of the smoke detector 132 will alert all ceiling turret sprinkler 10 via hardwired or Wi-Fi 24 connection. Each ceiling turret sprinkler 10 checks if the alert is generated from its own smoke detector 132. If the alert is confirmed to be generated from its own detector 132, the affected ceiling turret sprinkler 10 releases its latch 21 dropping down its automated flame tracking turret fire sprinkler module 100. The module 100 sliding down until its turret head 111 cleared from the panel 14 starts searching for fire 50 with pan 119 and tilt 118 direction motion then blasting the fire 50 with its fire suppressant 39 from its tank 27. Since its ceiling tank 27 has limited capacity, as soon as the spray pump 26 starts drawing suppressant 39, its top-off fluid shutoff valve 23 open allows the interior large capacity remotely located supplemental fire suppressant storage tank 573 replenish the ceiling tank 27 automatically via the pressure sensitive regulated switch 531, fire suppressant top off pump 526, stirring pump 525 and hose 210. The auto replenishing action assures the ceiling tank 27 is always filled with fire suppressant 39.

The system 500 has an optional large capacity remotely located supplemental fire suppressant storage tank 574 includes fire suppressant top off pump 526*x*, stir pump 525, top-off fluid shutoff valve 527*x*, pressure sensitive regulator switch 531 and hose 210*x* for storing dissimilar fire suppressant 39 for a purpose of dual suppressant dual nozzle turret sprinkler system 400 depicted in FIG. 7 for reference.

The remotely located rechargeable battery power for the system 500 is provided by a 12v, 35 amp rechargeable battery pack 522 which has enough energy to power the four sprinkler systems 10 simultaneously for an hour.

The integrated smoke detector 132 of system 10 is compatible with traditional smoke detector 532 via a common trigger signal line 202 and through a relay switch 571 able to activate an exterior installed siren 570 or send notification to fire dept. or via Wi-Fi 24.

The system 500 shows four rooms equipped with flip down concealed ceiling turret fire sprinkler 10. Room 3 and room 6 are not affected with fire 50 and their automated flame tracking turret fire sprinkler module 100 are remain stowed in the ceiling cavity 33 while room 4 and room 5 are showing the sprinkler system 10 are in deployed position with their sprinkler modules 100 are dropped and spraying suppressant 39 at the fire 50.

The system 500 further accepts the exterior suppressant 39 replenishment via top-off fluid shutoff valve 527 and exterior fill hose 528 at port 517 and battery charge via cable 529 with protection diode 534 at port 515.

A mobile exterior fill station 550 and mobile exterior power battery charger 560 shown on FIG. 9A contains a fire suppressant tank 553 complete with an exterior fire suppressant top off pump 551 and a stirring pump 552 and battery charger 560. The mobile station 550 is to be rolled to the exterior wall of a home connecting to (FDC) Fire Dept. Connection port extended the fire fighting duration due to a severe fire situation.

Figures 10, 11:
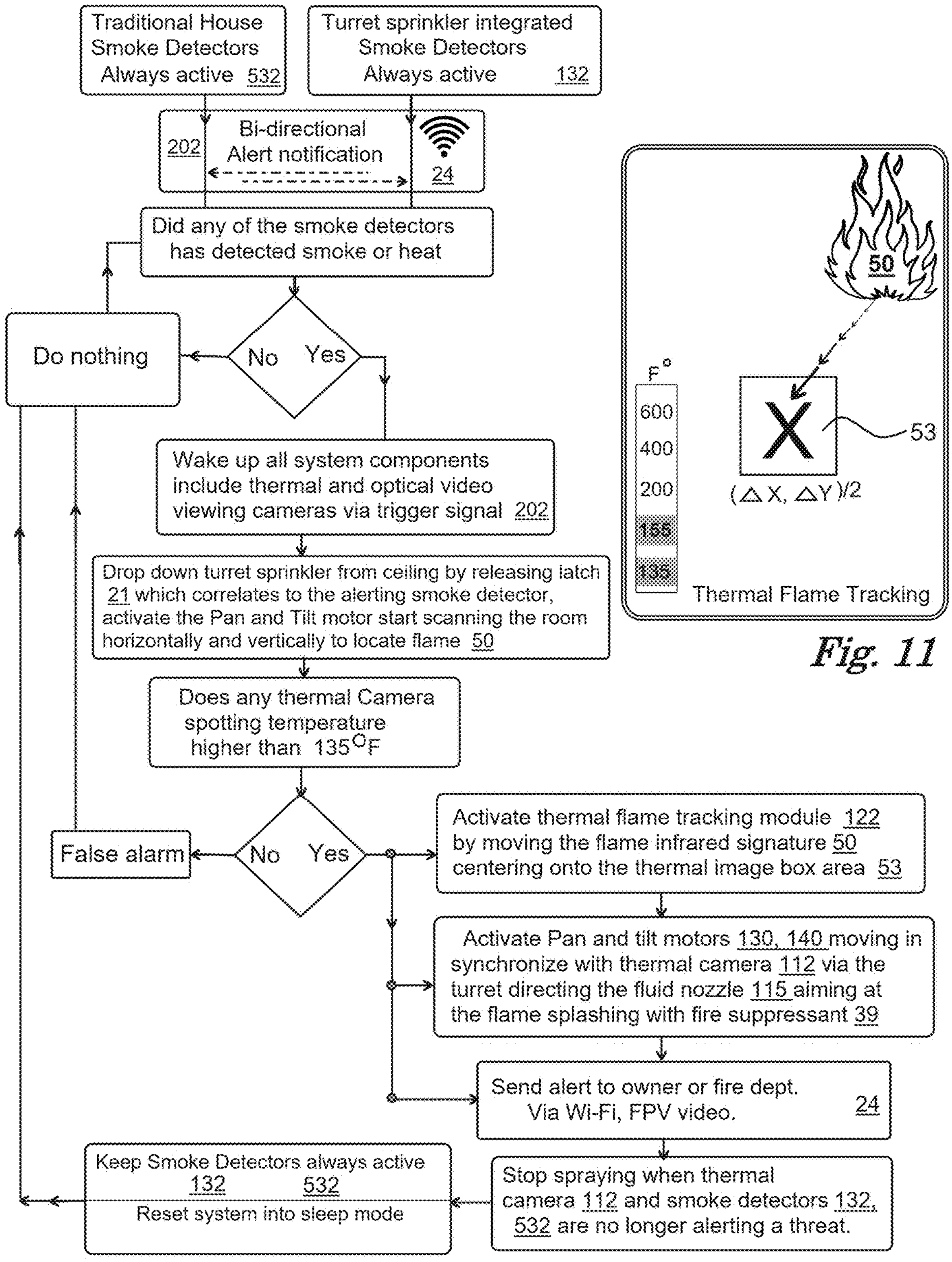
FIG. 10 is a system operation illustration of the turret sprinkler from start to stop in accordance with an embodiment of the present disclosure.
FIG. 11 is an exemplary projected image illustrating how the pan tilt base carries the nozzle to track the flame by moving the thermal image on fire into the center of the box location to put out a fire in accordance with an embodiment of the present disclosure.

Turning to FIG. 10 is flow chart illustrating the process of system 500 putting out a fire 50 from detection to extinguish a fire 50 through the use of optical video camera 114 with face-object movement tracking, thermal sensor camera 112 on Open MV Pure Thermal board, using a Raspberry Pi Computer board and OpenCV and Pan-Tilt HAT. FIG. 11 illustrates the fire 50 displays on the image frame being pulled into the center on frame 53 positions which is the fire suppressant spray nozzle 115 target areas to land the fire suppressant 39.

Figure 13D:
FIG. 13D is the perspective view of a piece of dried fire suppressant coating left on the surface after the bubble popped in accordance with an embodiment of the present disclosure.
Figure 13:
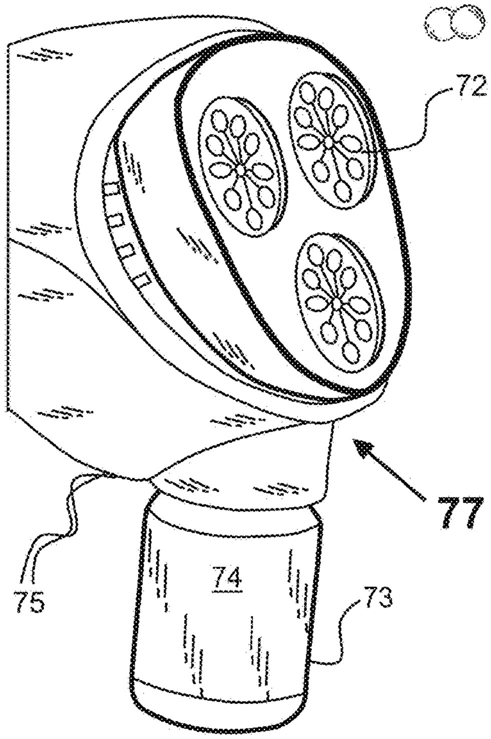
FIG. 13 is the perspective view of a bubble generator module in accordance with an embodiment of the present disclosure.
Figure 13E:
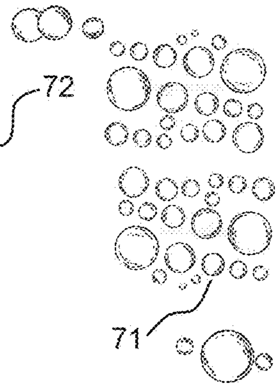
FIG. 13E is the perspective view of bubbles drifting in a room in accordance with an embodiment of the present disclosure.
Figure 13C:
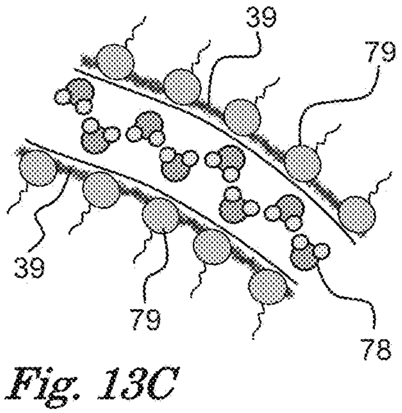
FIG. 13C is the view of a highly magnified soap bubble with added fire suppressant in accordance with an embodiment of the present disclosure.
Figure 13A:
FIG. 13A is another perspective view of a bubble in accordance with an embodiment of the present disclosure.
Figure 13B:
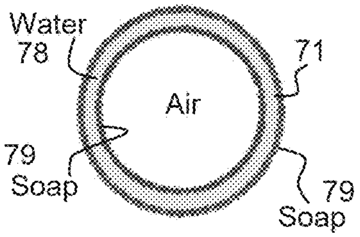
FIG. 13B is the view of a highly magnified bubble in accordance with an embodiment of the present disclosure.
Figure 12:
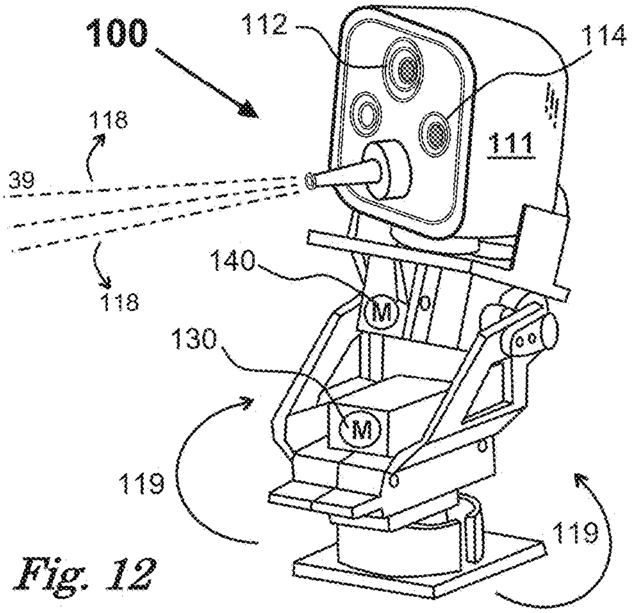
FIG. 12 is the perspective view of a pan tilt base with its outer decorative shell removed to show the interior details in accordance with an embodiment of the present disclosure.
Figure 13F:
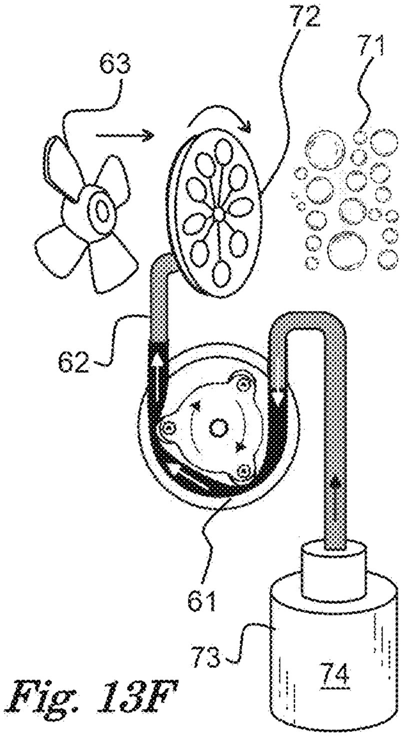
FIG. 13F is the perspective view showing how bubbles are made in accordance with an embodiment of the present disclosure.

FIG. 12 is an automated flame tracking turret fire sprinkler module 100 showing its interior view with its housing removed showing the pan and tilt mechanical system carrying the turret head 111. The turret pan servo motor 130 is able to rotate 360 degrees shown in arrow 119 and tilt servo motor 140 is able to rotate 180 degrees as shown in arrow 118. FIG. 13 is a bubble generator module 77 includes a soap bottle 73, soap bubble solution 74 is added with fire suppressant or retardant 39 such as Polyphosphate, Ammonium Polyphosphates, Mono ammonium Polyphosphates, Sodium Polyphosphate and the like. A power cable 75 supplies power to run a group of peristaltic pumps 61 and blower fans 63. Soap solution 74 is being sucked into the pump 61 forced out through the tube 62 discharging on the bubble spinning wheels 72 then blowing out to a room shown on FIG. 13F. Bubble 71 once left bubble machine 77 floating on air and drifting in the room shown on FIG. 2. After the bubble popped left a coating of fire retardant 39 shown on FIG. 13D. The fire suppressant or retardant 39 Ammonium polyphosphates swelling up when heated thus protecting material underneath in event of a fire. FIG. 13A is a soap bubble 71. An enlarged view of a soap bubble 71 shown on FIG. 13B. A molecular structure of a bubble 71 showing on FIG. 13C includes water 78, soap molecule 79 and fire retardant molecule 39 embedded on the soap solution 74.

A large quantity of bubbles 71 displacing the combustible gas in a room, thus speeding up extinguishing a fire 50 with the combined effort using automated flame tracking turret fire sprinkler module 100 and bubble generator module 77.

Figure 14:
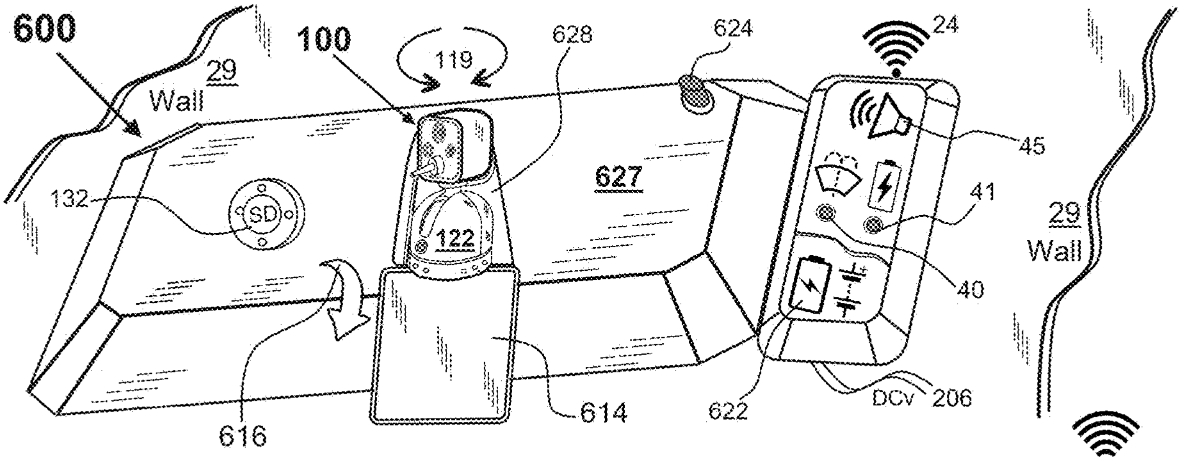
FIG. 14 is the perspective view of an all-in-one single piece fire suppression sprinkler system including suppressant tank and uninterrupted battery power with concealed automated flame tracking turret fire sprinkler module installed on an upper room wall or over a door header position in accordance with an embodiment of the present disclosure.

Turning to FIG. 14 is an integrated, ideal for retrofit application single piece all-in-one (ROFSS) retrofit one piece fire sprinkler system 600, which is a variant of FIG. 6. The system 600 resembles the system 700 includes control panel 637 and battery 622, a large capacity fire suppressant tank 627, a suppressant pump 626, a stirring pump 625, a top-off fluid shutoff valve 623 and fill inlet 624. The automated flame tracking turret fire sprinkler module 100 normally recesses on a recessed cradle 628 which connects to hose 228 and power cable 229.

Figure 14A:
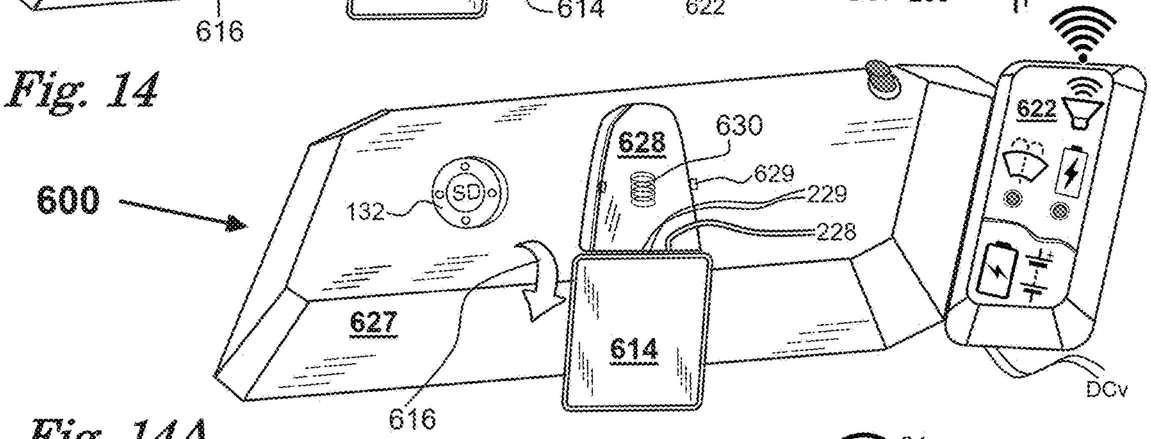
FIG. 14A is the perspective view of an all-in-one single piece fire suppression sprinkler system showing automated flame tracking turret fire sprinkler module removed to reveal the cradle and a spring and its cover plate in flipped down position in accordance with an embodiment of the present disclosure.

When a fire 50 is detected, the sprinkler module 100 sends a signal to release the turret cover plate release latch 629 shown on FIG. 14A causes the turret module 100 which is under the spring 630 tension pushes out the turret 100 along with cover 614 being flipped down as shown in arrow 616. Once the turret module 100 cleared from its cradle 628, the sprinkler 100 began to fight the erupted fire 50. For illustration purpose, the sprinkler module 100 is removed to reveal the cradle 628. The single piece system 600 is ideally to be installed above a window, installed on the upper room position of a wall 29 and on top of a door header as shown on FIG. 5. In reference to FIG. 4 installation, the installed fire sprinkler system 600 mimics the look of a wall mounted split air handler 90 from an air conditioner.

Figure 14B:
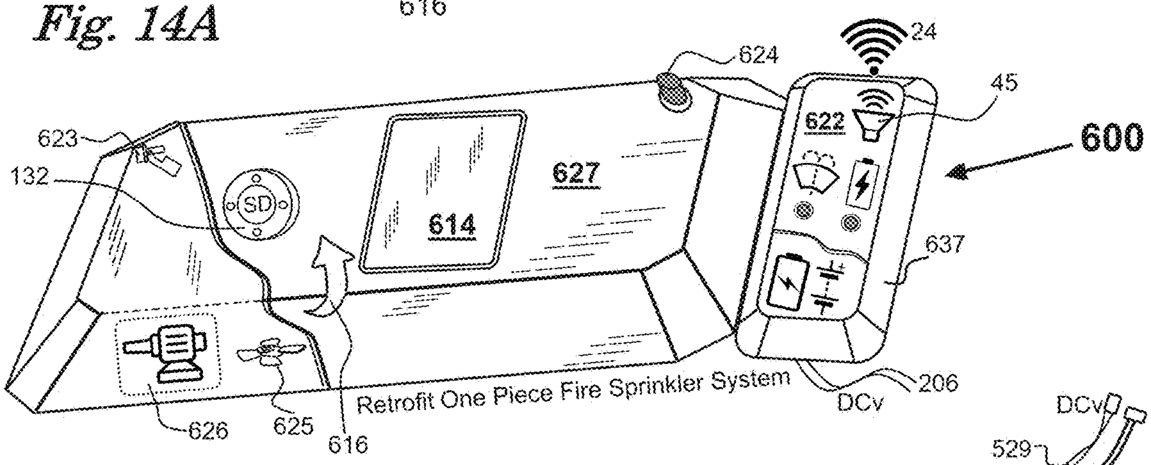
FIG. 14B is the perspective view of an all-in-one single piece upper room mounted fire suppression sprinkler system with its flip open turret cover plate in closed non deployed position in accordance with an embodiment of the present disclosure.
Figure 3A:
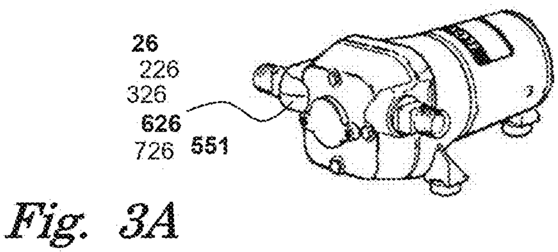
FIG. 3A is a perspective view showing a popular application of a high pressure, high flow rate fire suppressant spray pump in recreation vehicles in accordance with an embodiment of the present disclosure.

FIG. 14B shows the sprinkler system 600 is in its normal appearance when the turret cover 614 is manually closed in non deployed position in accordance with an embodiment of the present disclosure.

A central fire sprinkler system method to maintain the smoke and heat detection sensor power on all time scouting for fire includes placing an automated flame tracking turret fire sprinkler module in sleep mode and concealing its video and thermal cameras by a controlled automated open cover plate or rotating the camera lens away to be not visible to protect an occupant's privacy and be ready to wake up and response to alert command sent from the smoke and the heat detection sensor.

Upon an alert signal confirmed, illuminating the area with an LED light via the automated flame tracking turret fire sprinkler module scanning the premises with its optical video camera (FPV—First Person View) and thermal image tracking camera and turning on the audio sounder for sending an alert to occupant, or fire department. The method also includes locking on the identified size and temperature of the erupted flame, activating the high pressure fire suppressant pump and forcing the liquid fire suppressant through the fire suppressant spray nozzle splashing the flame with liquid fire suppressant such as Polyphosphate, Ammonium Polyphosphate, Sodium Polyphosphate, Mono ammonium phosphate. The method further includes continuing to track and follow the flame movement with the automated flame tracking turret fire sprinkler module splashing it with liquid fire suppressant until the fire is extinguished, and based on the smoke and heat detection sensor no longer sending an alert, shutting off the high pressure fire suppressant pump and keeping the smoke and heat detection sensors active to assure fire will not reignite.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. A central fire sprinkler system comprising:

a flip down hinged door panel installed on a ceiling with a smoke and heat detection sensor, a low fire suppressant level warning indicator, an audio sounder attached on a front surface of the flip down hinged door panel and a electromechanical release latch for the flip down hinged door panel;

an automated flame tracking turret fire sprinkler on rollers riding on a set of slide rails anchored on a back side of the flip down hinged door panel;

a recessed mounted flame resistance housing installed in a ceiling cavity behind the flip down hinged door panel and comprising a fire suppressant spray pump and a fire suppressant tank with a fire suppressant supply hose there between, a fluid shutoff valve, and a stirring pump and fill inlet; and a remotely located supplemental fire suppressant storage tank, a built-in fire suppressant top off pump, a remote fire suppressant supply hose, a fire suppressant shutoff valve, a stirring pump and fill inlet for a fire suppressant.

2. The central fire sprinkler system of claim 1, wherein the front surface of the flip down hinged door panel is configured to receive a ceiling tile matching with ceiling tiles adjacent thereto.

3. The central fire sprinkler system of claim 1, wherein the fire suppressant tank supplies the fire suppressant to the fire suppressant spray pump, and the remotely located supplemental fire suppressant storage tank supplies the fire suppressant to the fire suppressant tank.

4. The central fire sprinkler system of claim 1, wherein the fire suppressant tank fluid shutoff valve shuts off the built-in fire suppressant top off pump based on a fluid pressure in the fire suppressant supply hose exceeding a set pressure limit due to the ceiling fire suppressant tank being full.

5. The central fire sprinkler system of claim 1, further comprising a network of interconnected automated flame tracking turret fire sprinklera and smoke and heat detection sensors configured to continuously remain active and send an alert signal to wake up all of the interconnected automated flame tracking turret fire sprinklers, but only energize a correlated electromechanical release latch and flip down hinged door panel and allow the correlated automated flame tracking turret fire sprinkler to drop down from the ceiling.

6. The central fire sprinkler system of claim 1, further comprises a bubble generator module comprising a soap bubble solution with added fire suppressant mixed in a soap solution bottle distributed by a fan, bubble spinning wheel and an electric peristaltic pump, wherein bubbles drifting and floating on air eventually pop and leave a coating of fire suppressant residual on surfaces throughout the premises to be protected from fire.

7. The central fire sprinkler system of claim 1, wherein the remotely located supplemental fire suppressant storage tank is installed in a lower wall position and supplies the fire suppressant via the fire suppressant supply hose connected to a fire suppressant spray nozzle, and wherein a power for the automated flame tracking B turret fire sprinkler is supplied by a control panel via an electric cable.

* * * * *